(12) United States Patent
Shiraki

(10) Patent No.: US 11,346,801 B2
(45) Date of Patent: May 31, 2022

(54) COMPOSITE SENSOR

(71) Applicant: Murata Manufacturing Co., Ltd., Nagaokakyo (JP)

(72) Inventor: Hiroshi Shiraki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/125,482

(22) Filed: Dec. 17, 2020

(65) Prior Publication Data

US 2021/0190716 A1 Jun. 24, 2021

Related U.S. Application Data

(63) Continuation of application No. PCT/JP2019/026518, filed on Jul. 3, 2019.

(30) Foreign Application Priority Data

Jul. 4, 2018 (JP) .............................. JP2018-127525

(51) Int. Cl.
*G01N 27/22* (2006.01)
*G01K 7/16* (2006.01)
*G01N 27/12* (2006.01)

(52) U.S. Cl.
CPC .............. *G01N 27/223* (2013.01); *G01K 7/16* (2013.01); *G01N 27/121* (2013.01); *G01N 27/226* (2013.01)

(58) Field of Classification Search
CPC ....... G01K 7/16; G01N 27/121; G01N 27/226
See application file for complete search history.

(56) References Cited

U.S. PATENT DOCUMENTS

| 5,531,097 A * | 7/1996 | Tsuchida | ............... | G01N 27/121 324/667 |
| 8,333,506 B2 * | 12/2012 | Kamenov | ............... | G01K 7/223 374/185 |
| 2004/0056321 A1 * | 3/2004 | Parsons | .................. | G01F 23/248 374/E7.021 |

(Continued)

FOREIGN PATENT DOCUMENTS

| CN | 103616087 A | 3/2014 |
| JP | S5991355 A | 5/1984 |

(Continued)

OTHER PUBLICATIONS

International Search Report Issued for PCT/JP2019/026518, dated Aug. 27, 2019.

(Continued)

*Primary Examiner* — Alvaro E Fortich
(74) *Attorney, Agent, or Firm* — ArentFox Schiff LLP

(57) ABSTRACT

A composite sensor including a temperature sensor unit that has a temperature-sensitive member and a humidity sensor unit including a moisture-sensitive member. The composite sensor further includes a first terminal used for the temperature sensor unit and the humidity sensor unit; a second terminal disposed to measure an electrical characteristic of the temperature-sensitive member with the first terminal; and a third terminal disposed to measure an electrical characteristic of the moisture-sensitive member with the first terminal.

17 Claims, 13 Drawing Sheets

(56) References Cited

U.S. PATENT DOCUMENTS

| | | | | |
|---|---|---|---|---|
| 2009/0173526 A1* | 7/2009 | Kloiber | .................. | H05K 3/321 |
| | | | | 29/829 |
| 2010/0307238 A1* | 12/2010 | Van Popta | ........... | G01N 27/225 |
| | | | | 73/335.04 |
| 2011/0259099 A1* | 10/2011 | Hong | ................... | G01N 27/223 |
| | | | | 73/335.04 |
| 2016/0161435 A1* | 6/2016 | Fujimoto | ............... | G01K 7/203 |
| | | | | 374/142 |

FOREIGN PATENT DOCUMENTS

| | | | |
|---|---|---|---|
| JP | S62156551 | A | 7/1987 |
| JP | H04289448 | A | 10/1992 |
| JP | H07280767 | A | 10/1995 |
| JP | 2006225454 | A | 8/2006 |
| JP | 2013134078 | A | 7/2013 |
| JP | 201859780 | A | 4/2018 |
| WO | 2015022891 | A1 | 2/2015 |

OTHER PUBLICATIONS

Written Opinion of the International Searching Authority issued for PCT/JP2019/026518, dated Aug. 27, 2019.

\* cited by examiner 1-2

3-1

FIG. 9
CAPACITANCE AND SENSITIVITY IN CASES OF COMB ELECTRODE
| Sensor element | 1-1 | 3-1 | 3-2 |
|---|---|---|---|
| 10%RH | 0.809pF | 1.366pF | 103.822pF |
| 90%RH | 1.030pF | 2.120pF | 157.602pF |
| Change rate | 27.3% | 55.2% | 51.8% |
FIG. 10
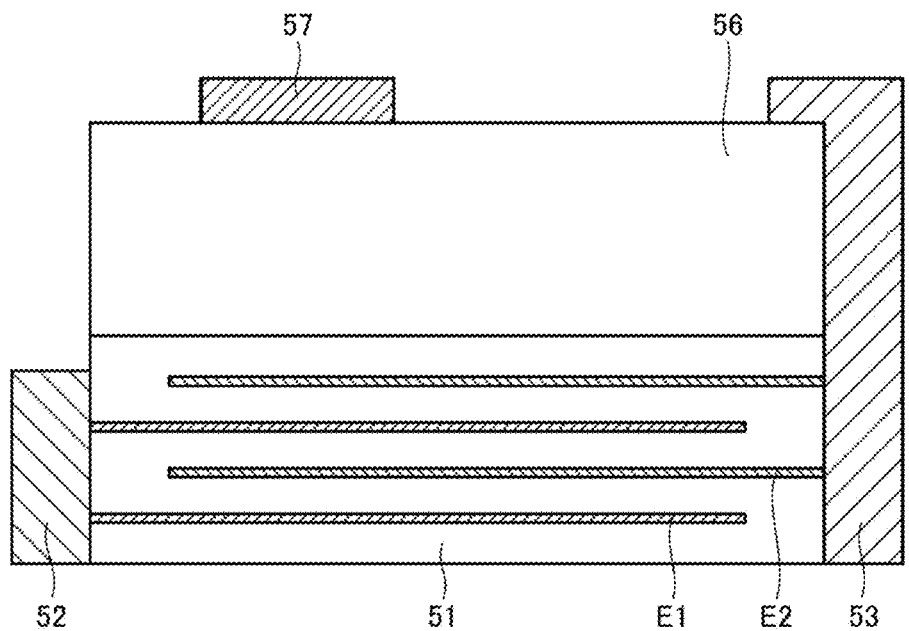
FIG. 11
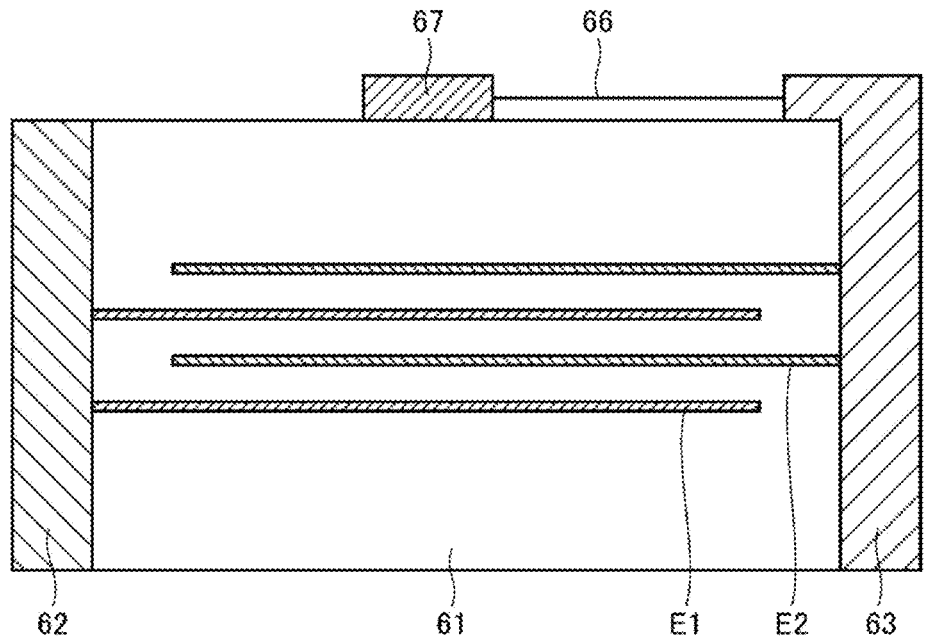

RESONANCE FREQUENCY IN CASE OF PLANAR COIL ELECTRODE

| Sensor element | 4-1 | 4-2 | 4-3 |
|---|---|---|---|
| 10%RH | 6.907GHz | 5.559GHz | 0.715GHz |

FIG. 24

CAPACITANCE IN CASE OF POLYIMIDE + BATIO$_3$ COMPOSITE

| Sensor element | 5-1 | 5-2 | 5-3 |
|---|---|---|---|
| Polyimide | 0.809pF | 1.366pF | 103.822pF |
| Polyimide + BaTiO$_3$ | 6.760pF | 13.810pF | 1209.336pF |
| Change rate | 8.35 times | 10.11 times | 11.65 times |

FIG. 25

CAPACITANCE IN CASE OF POLYIMIDE + CACU$_3$TI$_4$O$_{12}$ COMPOSITE

| Sensor element | 5-4 | 5-5 | 5-6 |
|---|---|---|---|
| Polyimide | 0.809pF | 1.366pF | 103.822pF |
| Polyimide + CaCu$_3$Ti$_4$O$_{12}$ | 31.595pF | 66.081pF | 5873.430pF |
| Change rate | 39.05 times | 48.38 times | 56.57 times |

FIG. 26

RESONANCE FREQUENCY IN CASE OF POLYIMIDE + FERRITE COMPOSITE

| Sensor element | 6-1 | 6-2 | 6-3 |
|---|---|---|---|
| Polyimide | 6.907GHz | 5.559GHz | 0.715GHz |
| Polyimide + ferrite | 3.677GHz | 0.427GHz | 0.039GHz |
| Change rate | 46.76% | 92.32% | 94.54% |

RESONANCE FREQUENCY IN CASE OF POLYIMIDE + BATIO₃ + FERRITE COMPOSITE

| Sensor element | 7-1 | 7-2 | 7-3 |
|---|---|---|---|
| Polyimide | 6.907GHz | 5.559GHz | 0.715GHz |
| Polyimide + BT + ferrite | 2.239GHz | 0.309GHz | 0.028GHz |
| Change rate | 67.58% | 94.44% | 96.08% |

RESONANCE FREQUENCY AND SENSITIVITY WHEN MATERIAL DENSITY DISTRIBUTION IS PROVIDED

| Sensor element | 6-3 | 8-1 | 9-1 |
|---|---|---|---|
| Resonance frequency | 39.812MHz | 42.193MHz | 9.560MHz |
| Resonance frequency change rate (10%RH→90%RH) | 20.66% | 23.28% | 10.85% |

PRIOR ART

COMPOSITE SENSOR

CROSS REFERENCE TO RELATED APPLICATIONS

The present application is a continuation of PCT/JP2019/026518 filed Jul. 3, 2019, which claims priority to Japanese Patent Application No. 2018-127525, filed Jul. 4, 2018, the entire contents of each of which are incorporated herein by reference.

TECHNICAL FIELD

The present invention relates to a composite sensor configured for detecting humidity and temperature.

BACKGROUND

Currently, humidity sensors and temperature sensors are used in a wide range of applications such as printers, air conditioners, air cleaners, microwave ovens, and automotive products. Further, the recent advances on the Internet of Things (IoT) technology have increased the need to monitor not only physical information such as location and speed, but also chemical information such as temperature, humidity, and gas.

In general, there are two types of humidity sensors: a resistance change type that measures a change in resistance of a humidity sensor material when the humidity changes; and a capacitance change type that measures a change in capacitance. Generally, the resistance change type has the advantage of a simple structure but has the disadvantages of poor accuracy and an inability to measure low humidity and high humidity. On the other hand, in the capacitance change type, capacitance changes linearly with respect to a change in humidity in a wide humidity range of 0 to 100% relative humidity (RH). Hence the capacitance change type has the advantage of high accuracy and has been used in a wide range of applications.

$Al_2O_3$, $TiO_2$, $SiO_2$, $SnO_2$, ZnO, $In_2O_3$, and polymer materials (polyelectrolytes, conducting polymers, etc.), and the like can be sued for the resistance change-type humidity sensor material. The resistance change-type humidity sensor measures a change in electric resistance when water is sucked to these materials, to measure the relative humidity in the atmosphere. A bridge circuit or the like is often used in the measurement.

Polymeric materials, such as polyimide, polyamide-imide, polyamide, cellulose acetate butyrate (CAB), polymethyl methacrylate (PMMA), vinyl crotonate, polyethylene terephthalate, and mixtures thereof, are often used as the humidity sensor material of the capacitance change type. The capacitance change-type humidity sensor measures a change in capacitance when water is sucked to these materials, to measure the relative humidity in the atmosphere.

When the humidity sensor is modularized and the humidity is measured with a microcomputer, the humidity sensor is incorporated in an LC resonance circuit or the like to measure a resonance frequency, and the resonance frequency is converted into capacitance to measure the capacitance. A resonance frequency f in the case of the LC resonance is expressed by $f=1/(2\pi(LC))$, where L represents an inductance of an external inductor and C represents the capacitance of the humidity sensor. It can be seen from this equation that the capacitance of the humidity sensor needs to be increased in order to lower the resonance frequency. By lowering the resonance frequency, a clock frequency for detecting the frequency can be lowered, so that the choice of the microcomputer is widened, leading to a reduction in the size and cost of the humidity sensor module. In addition, the lower the frequency is, the less likely it is to be affected by noise due to parasitic capacitance or disturbance.

For example, International Publication No. 2015/022891 (hereinafter "Patent Document 1") discloses a temperature and humidity sensor having a three-terminal structure. In this sensor, an electrode and a coil-shaped upper electrode are connected through a via at the center part. By forming these electrodes with Pt, a change in electric resistance of Pt due to a change in temperature is measured to prepare a temperature sensor. The upper electrode also serves as the upper electrode of the humidity sensor, and humidity can be measured by measuring a change in capacitance of a humidity sensor material between the upper electrode and the lower electrode. At the time of measuring the humidity, a resonance circuit is constituted using an inductor and a capacitor formed in the sensor, and a change in LC resonance frequency is measured, thereby measuring the humidity.

For example, Japanese Patent Application Laid-Open No. Hei 7-280767 (hereinafter "Patent Document 2") discloses a composite sensor in which a humidity sensor is formed on one side of a substrate, and a temperature sensor is formed on the other surface. With this configuration, the size can be reduced, and the humidity of the temperature or the temperature of the humidity can be more accurately corrected taking advantage of the fact that the physical distance is closer than when the sensors are disposed separately.

In the composite sensor disclosed in Patent Document 1, a change in electric resistance between two terminals of a resistor formed of a Pt layer is measured at the time of temperature measurement. On the other hand, at the time of humidity measurement, the humidity can be measured by measuring a change in LC resonance frequency using three terminals. In this composite sensor, a part (e.g., a coil portion) of the resistor of the Pt layer used for the temperature measurement and humidity measurement is shared, and hence the temperature and humidity cannot be measured simultaneously, which is problematic.

In the composite sensor disclosed in Patent Document 2, although the physical distance between the temperature sensor and the humidity sensor is closer than when the sensors are disposed separately, a physical distance still exists between the two sensors because a substrate is disposed between the temperature sensor and the humidity sensor. Thus, the humidity around the humidity sensor and the humidity around the temperature sensor are not exactly the same. In addition, the thermal capacity of the substrate is likely to cause a difference between the temperature of the atmosphere and the temperatures of the temperature and humidity sensors, particularly when there is a change in temperature.

Further, in Patent Document 2, the humidity sensor has two terminals and the temperature sensor has two terminals, forming a structure of four terminals in total, and hence a large amount of space is required for actual mounting, which is problematic.

SUMMARY OF THE INVENTION

The exemplary embodiments of the present invention have been made to solve the above problems. Thus, it is an object of the present invention to provide a composite sensor that can simultaneously measure temperature and humidity and has improved accuracy.

Accordingly, a composite sensor is provided in which a temperature sensor that includes a temperature-sensitive member having resistivity that changes in accordance with temperature and a humidity sensor that includes a moisture-sensitive member having capacitance that changes in accordance with humidity are integrated. The composite sensor includes a first terminal that can be used for the temperature sensor and the humidity sensor; a second terminal disposed to measure an electrical characteristic of the temperature-sensitive member with the first terminal; and a third terminal disposed to measure an electrical characteristic of the moisture-sensitive member with the first terminal.

According to the present invention, separate voltages can be applied to the temperature sensor by using the first terminal and the second terminal, and to the humidity sensor by using the first terminal and the third terminal, so that it is possible to simultaneously measure temperature and humidity. With the temperature sensor and the humidity sensor having the integral structure, the temperature of the humidity sensor and the humidity of the temperature sensor can be corrected more accurately. In addition, due to the integral structure, the size can be reduced at the time of mounting as compared to when the temperature sensor and the humidity sensor are provided separately. Furthermore, due to the three-terminal structure, the mounting area can be reduced as compared to a composite sensor having a four-terminal structure.

BRIEF EXPLANATION OF DRAWINGS

FIG. 9 is a diagram showing a comparison in characteristics among the sensor elements (1-1), (3-1), (3-2).

FIG. 10 is a sectional view showing a first example of a composite sensor in which the humidity sensor unit has a laminated structure.

FIG. 11 is a sectional view showing a second example of the composite sensor in which the humidity sensor unit has the laminated structure.

FIG. 23 is a diagram showing characteristics of sensor elements (4-1), (4-2), (4-3) side by side.

FIG. 24 is a diagram showing characteristics of sensor elements (5-1), (5-2), (5-3) side by side.

FIG. 25 is a diagram showing characteristics of sensor elements (5-4), (5-5), (5-6) side by side.

FIG. 26 is a diagram showing characteristics of sensor elements (6-1), (6-2), (6-3) side by side.

DETAILED DESCRIPTION

Figure 1:
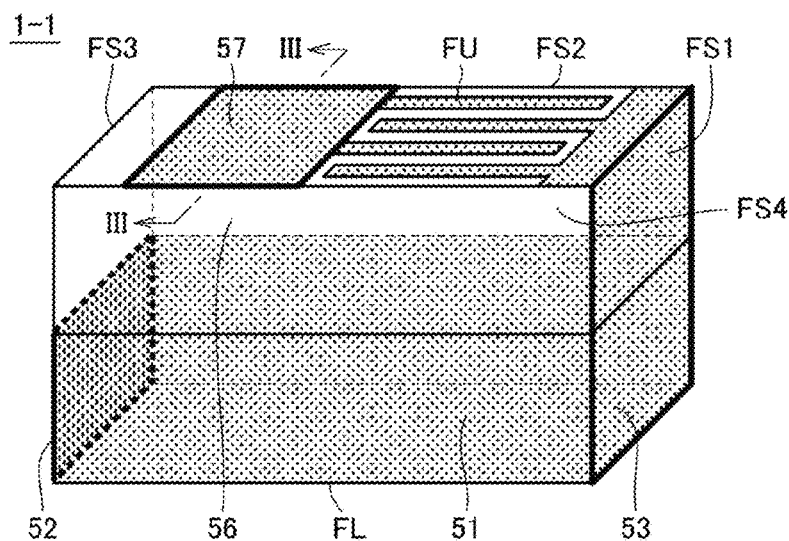
FIG. 1 is a perspective view showing a configuration of a composite sensor of a first exemplary embodiment.

Hereinafter, examples of embodiments of the present invention will be described with reference to the drawings. Note that the same or corresponding portions in the drawings are denoted by the same reference numerals, and the description thereof will not be repeated.

First Exemplary Embodiment

Figure 2:
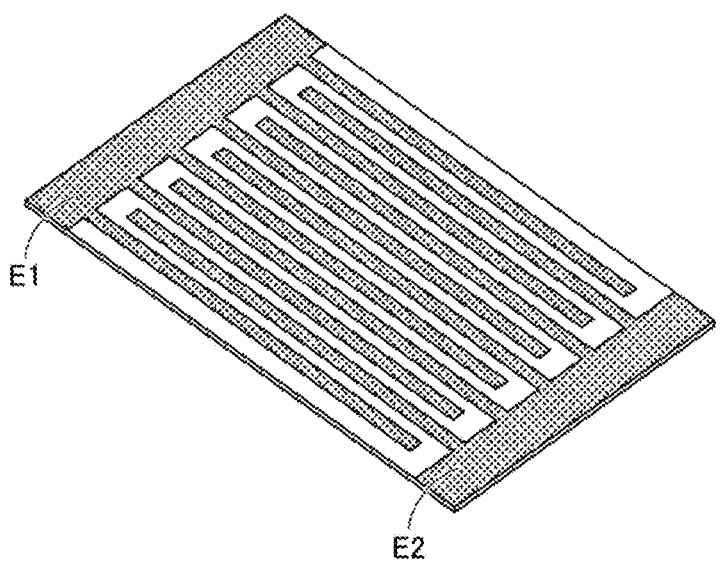
FIG. 2 is a plan view showing an electrode forming surface of a humidity sensor unit in the composite sensor of the first exemplary embodiment.
Figure 3:
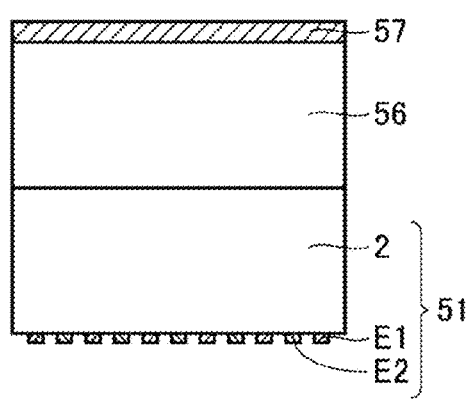
FIG. 3 is a sectional view taken along line III-III in FIG. 1.

FIG. 1 is a perspective view showing a configuration of a composite sensor of a first exemplary embodiment. FIG. 2 is a plan view showing an electrode forming surface of a humidity sensor unit in the composite sensor of the first embodiment. FIG. 3 is a sectional view taken along line III-III in FIG. 1.

A composite sensor 1-1 shown in FIG. 1 is a composite sensor in which a temperature sensor unit 56 including a temperature-sensitive member and a humidity sensor unit 51 including a moisture-sensitive member are integrated. The composite sensor 1-1 is provided with a first terminal 53 that can be configured for the temperature sensor unit 56 and the humidity sensor unit 51; a second terminal 57 disposed and configured to measure an electrical characteristic of the temperature-sensitive member with the first terminal 53; and a third terminal 52 disposed and configured to measure an electrical characteristic of the moisture-sensitive member with the first terminal 53.

Preferably, the temperature-sensitive member of the temperature sensor unit 56 is laminated on the moisture-sensitive member of the humidity sensor unit 51. When the surfaces intersecting the laminating direction of the composite sensor are an upper surface FU and a lower surface FL, and the surfaces along the laminating direction of the composite sensor are side-surfaces FS1 to FS4, the first terminal 53 is formed on the side-surface FS1.

More preferably, the composite sensor 1-1 has a rectangular parallelepiped shape. The side-surfaces of the rectangular parallelepiped include first to fourth side-surfaces FS1 to FS4, the first terminal 53 is formed on the first side-surface FS1, the third side-surface FS3 is formed on the side-surface opposite to the first side-surface FS1, and the third terminal 52 is formed on the third side-surface FS3. Preferably, the second terminal 57 is formed on the upper surface FU orthogonal to the laminating direction of the composite sensor.

In the first embodiment, the capacitance change-type humidity sensor unit 51 and the temperature sensor unit 56 are integrated in a three-terminal structure with the respective ground (GND) terminals made common. As a moisture-sensitive member 2 (see FIG. 3) of the capacitance change-type humidity sensor unit 51, for example, polyimide, polyamide-imide, polyamide, cellulose acetate butyrate (CAB), polymethyl methacrylate (PMMA), vinyl crotonate, polyethylene terephthalate, or a mixture thereof can be used. By forming electrodes E1, E2 shown in FIG. 2 on the surface of the moisture-sensitive member 2 as shown in FIG. 3, a change in the capacitance of the moisture-sensitive member 2 can be measured with the terminals 52, 53 connected to the electrodes E1, E2, respectively.

When the composite sensor 1-1 having the electrodes E1, E2 as external electrodes formed on the surface of the moisture-sensitive member 2 is surface-mounted on a printed wiring board as shown in FIG. 3, for example, it is preferable to mount the second side-surface FS2 of FIG. 1 to be on the printed-wiring-board side so that comb-shaped electrodes formed on the upper surface FU and the lower surface FL are not on the board side.

As the temperature sensor unit 56, for example, a generally known temperature-sensitive member, such as a negative temperature coefficient (NTC) thermistor, a temperature measuring resistor (Pt, PtCo, Ni, Cu, etc.), a thermocouple, a pyroelectric temperature sensor, or a semiconductor temperature sensor (diode, transistor, integrated circuit (IC), etc.), can be used. The electrical characteristics of these temperature-sensitive members can be measured with the terminals 57 and 53. In FIG. 1, a comb-shaped electrode pattern is formed between the terminal 57 and the terminal 53 such that a resistance value between the terminal 57 and the terminal 53 becomes low in order to facilitate measurement even when the electrical resistivity of the temperature-sensitive member is high. It is noted that the comb-shaped electrode pattern is not necessarily required, and the surface of the temperature-sensitive member having no electrode pattern formed thereon may be exposed between the terminal 57 and the terminal 53 in an alternative aspect.

Figure 4:
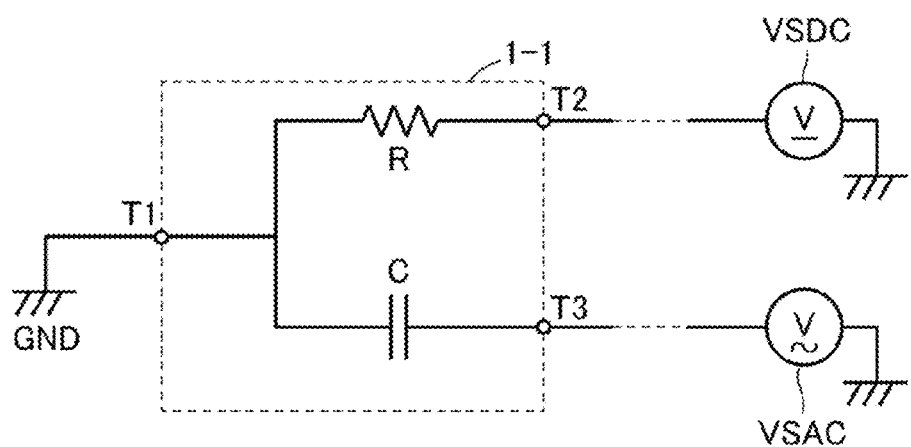
FIG. 4 is an equivalent circuit of the composite sensor.

FIG. 4 is an equivalent circuit of the composite sensor. Referring to FIGS. 1 and 4, a terminal T1 corresponds to the first terminal 53 configured to be used for the temperature sensor unit 56 and the humidity sensor unit 51. The terminal T2 corresponds to the second terminal 57 disposed and configured to measure an electrical characteristic of the temperature-sensitive member with the first terminal 53. The terminal T3 corresponds to the third terminal 52 disposed and configured to measure an electrical characteristic of the moisture-sensitive member with the first terminal 53

Referring to FIG. 4, the first terminal T1 is a ground terminal connected to GND, a direct current (DC) voltage source VSDC is connected between the first terminal T1 and the second terminal T2, and an alternating current (AC) voltage source VSAC is connected between the first terminal T1 and the third terminal T3. Although not shown, a resistance measurement circuit and a capacitance measurement circuit are connected between the second terminal and the DC voltage source VSDC and between the third terminal and the AC voltage source VSAC, respectively.

A resistor R is the equivalent resistor of the temperature-sensitive member. Capacitance C is the equivalent capacitance of the moisture-sensitive member. The temperature can be measured between the terminals T1 and T2, and simultaneously, the humidity can be measured between terminals T1 and T3.

Figures 29, 30:
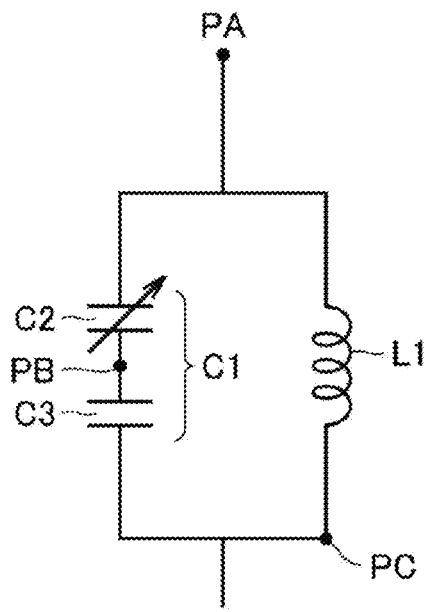
FIG. 29 is a diagram showing characteristics of sensor elements (6-3), (8-1), (9-1) side by side.
FIG. 30 is an equivalent circuit diagram of a composite sensor of a comparative example.

FIG. 30 is an equivalent circuit diagram of a composite sensor of a comparative example. The composite sensor of the comparative example is a composite sensor disclosed in Patent Document 1. As shown in the circuit configuration of FIG. 30, an LC resonance circuit formed between terminals PA and PB is connected between an input of an amplifier and a ground node at the time of humidity measurement, and a change in resonance frequency is observed to measure humidity. On the other hand, at the time of temperature measurement, the temperature is measured by measuring a change in resistance between the terminals PA and PB. Therefore, the temperature and humidity cannot be measured simultaneously in the circuit configuration of FIG. 30.

In contrast, in the present embodiment, by adopting the circuit configuration shown in FIG. 4, separate voltages can be applied to the temperature sensor and the humidity sensor, so that simultaneous measurement of temperature and humidity can be performed.

With the temperature sensor and the humidity sensor having the integral structure, the temperature of the humidity sensor and the humidity of the temperature sensor can be more accurately corrected in a detection circuit to which the temperature sensor and the humidity sensor are connected.

In addition, with the temperature sensor and the humidity sensor having the integral structure, it is possible to reduce the size at the time of mounting as compared to when the two sensors are prepared separately. Even when the sensors are integrated in the same manner, the three-terminal structure with the GND terminals made common is formed in the present embodiment, so that the mounting area can be reduced as compared to a four-terminal structure having no common terminal.

Next, a description will be given of a specific example in which polyimide is used as the moisture-sensitive material, and an NTC thermistor of $NiMn_2O_4$ is used as the temperature-sensitive material.

As the raw material of the polyimide, polyimide varnish, in which a polyamic acid is dissolved in an N-methyl-2 pyrrolidone (NMP) solvent, is used. The polyimide varnish is applied onto a PET film using a doctor blade having a thickness of 100 μm, and the sheet is moved while being dried at a temperature of 60° C. to form a polyimide precursor on the PET film. When a doctor blade having a thickness of 100 μm is used, the thickness of the sheet at this time is about 20 μm (about 15 μm after firing). When the thickness of the sheet is to be reduced, the thickness of the doctor blade may be reduced. For example, when a doctor blade having a thickness of 50 μm is used, a polyimide precursor sheet having a thickness of 10 μm (about 7.5 μm after firing) can be formed.

After the sheet is cut, Ag paste is screen-printed in the comb shape shown in FIG. 2 to form electrodes E1, E2 on the polyimide precursor sheet. The shapes of the electrodes E1, E2 can be changed by forming the printed pattern into a flat plate shape, a comb shape, or a meandering shape. After the printing, drying is performed in a dryer at 60° C. for five minutes. Although the Ag paste is used for the printing here, the type of electrode material can be changed by using a paste of a material desired to be used as an electrode. The electrode may be prepared using a thin film forming process such as a sputtering method or a vapor deposition method.

A thick film of $NiMn_2O_4$ for the NTC thermistor having a thickness of 3 μm, patterned by using a metal mask, is formed at room temperature by an aerosol deposition method (AD method) on the opposite side of the surface with the electrodes printed thereon, of the surfaces of the polyimide precursor sheet as thus prepared. As the electrode for the NTC thermistor, a NiCr/Monel/Ag electrode is formed by sputtering.

In this state, after the sheet is cut into the size of a target composite sensor, the sheet is fired at 350° C. for one hour in an air atmosphere. An Ag extended electrode is formed on a sample after firing, and then, the sample is further fired at 100° C., so that a sensor element (1-1) shown in FIGS. 1 and 3 can be obtained.

The NTC thermistor as thus prepared has a B constant of 3450 K at 25° C./50° C. and a resistivity p of 2.6 kΩcm at 25° C. Note that an NTC thermistor with any composition can be formed by using a raw material most suitable for the raw material in the preparation of the NTC thermistor. Although $NiMn_2O_4$ has been described above as an example, the NTC thermistor in the present embodiment is not limited to $NiMn_2O_4$, but may be any one so long as being used as an NTC thermistor in general. Further, the method of forming the thick film of the NTC thermistor is not limited to the AD method but may be any method so long as forming a film at a glass transition temperature (e.g., about 450° C.) or lower of the polyimide.

Figure 5:
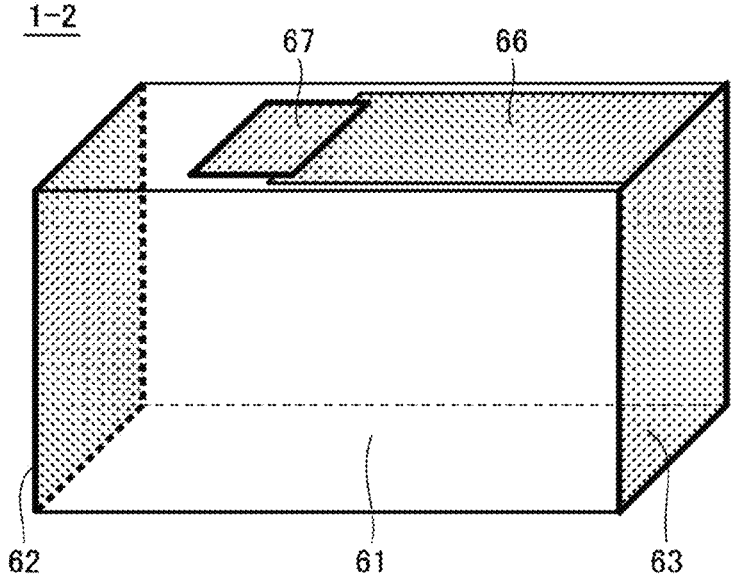
FIG. 5 is a view showing a modification of a sensor element in which a humidity sensor and a temperature sensor are integrated.

The capacitance of the humidity sensor portion as thus formed was 0.809 pF. The temperature sensor integrated with the humidity sensor may use a change in electric resistance of Pt. FIG. 5 is a view showing a modification of the sensor element in which the humidity sensor and the temperature sensor are integrated. The Pt temperature sensor unit 66 is prepared in parallel with the process of preparing the humidity sensor unit 61. In the same manner as the above method, a polyimide precursor sheet is formed, Pt paste is printed on the opposite side of the surface having the humidity sensor electrode printed thereon, and the temperature sensor unit 66 is patterned. The sheet is cut into a target size, and fired at 350° C. for one hour in an air atmosphere to obtain a sensor element (1-2) shown in FIG. 5. The temperature coefficient of the Pt temperature sensor unit 66 between 25° C. and 85° C. was measured to be 3800 ppm/K, and a characteristic equivalent to that of a general Pt temperature sensor is obtained. Note that the Pt temperature sensor unit 66 may be formed by a general thin film or thick film forming method such as a vapor deposition method or a sputtering method.

Second Exemplary Embodiment

In the first embodiment, the capacitance change type has been used as the humidity sensor, but in a second embodiment, a resistance change-type humidity sensor and a temperature sensor are integrated in a three-terminal structure with which the respective GNDs made common. As the resistance change-type humidity sensor material, known $Al_2O_3$, $TiO_2$, $SiO_2$, $SnO_2$, ZnO, $In_2O_3$, polymer materials (polyelectrolytes, conducting polymers, etc.), and the like can be used.

As an example, a description will be given of a preparation method in a case where Na-added $Al_2O_3Na$ (Na-added alumina) is used as the moisture-sensitive material of the resistance change-type humidity sensor and an NTC thermistor is used as the temperature sensor.

First, alumina powder, sodium nitrate, a binder, a plasticizer, a defoaming agent, and a wetting agent are dispersed in water such that the amount of Na added is 2 wt % with respect to alumina to prepare a slurry. While the slurry is used to be dried at a temperature of 60° C. with a 100 μm doctor blade, a sheet is moved, to prepare a Na-added alumina precursor sheet on a PET film. An Ag electrode having the same pattern as that of the sensor element (1-1) (FIG. 2) is printed on this sheet and peeled off from the PET film. Thereafter, a thick film of $NiMn_2O_4$ for the NTC thermistor having a thickness of 3 μm, patterned by using a metal mask, is formed at room temperature by an aerosol deposition method (AD method) on the opposite side of the surface of the sheet with the electrodes printed thereon. As the electrode for the NTC thermistor, a NiCr/Monel/Ag electrode is formed by sputtering. In this state, the sheet is cut into the size of a target composite sensor, and then fired at 900° C. for two hours to prepare a humidity sensor using Na-added alumina, thereby obtaining a sensor element (2-1). In the humidity sensor prepared by such a method, when the humidity was changed from 10% RH to 90% RH, the electric resistance changed about 48 times from 925 kΩcm to 19 kΩcm.

Third Exemplary Embodiment

A third embodiment is characterized in that a capacitance-type humidity sensor is used as the humidity sensor, and an internal electrode covered with a moisture-sensitive member is provided as the electrode for the humidity sensor. The shape of the internal electrode is a flat plate shape, a comb shape, a meandering shape, or the like. A plurality of layers of these electrodes may be formed in any combination.

The internal electrode has no exposed portion, so that the influence of dew condensation on results of humidity measurement can be reduced. Further, the proportion of the moisture-sensitive member around the electrode increases, and hence the humidity can be measured with high sensitivity.

When the electrode is disposed inside the humidity sensor material, the configuration can reduce the influence of electrode corrosion due to corrosive gas in the atmosphere on results of humidity measurement. Gas permeabilities through the moisture-sensitive member of $SO_2$, $NH_3$, and $H_2S$, which are representative corrosive gases, were measured, respectively, by a method according to Japanese Industrial Standards (JIS) K 7126. When the moisture-sensitive member was a polyimide sheet having a thickness of 15 μm, the gas permeabilities of $SO_2$, $NH_3$, and $H_2S$ were $2.39 \times 10^{-13}$ mol/(s·m$_2$/Pa), $1.26 \times 10^{-13}$ mol/(s·m$_2$/Pa), and $5.02 \times 10^{-14}$ mol/(s·m$_2$/Pa), respectively. Considering that corrosive gas is directly exposed to the electrode in the case of the external electrode, it is understood that the internal electrode has a certain gas permeation reducing effect on each corrosive gas. It is thus understood that the resistance to gas corrosion is improved as compared to when the electrode is directly opened to the atmosphere.

Figure 6:
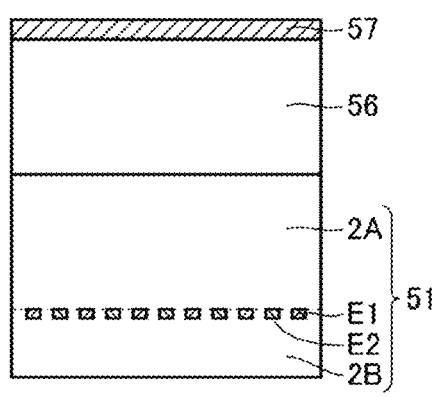
FIG. 6 is a sectional view showing a case where electrodes are covered with a moisture-sensitive member.

FIG. 6 is a sectional view showing a case where the electrodes are covered with the moisture-sensitive member. A sensor element (3-1) shown in FIG. 6 has a structure in which layers of polyimide having a thickness of 15 μm are laminated on the surfaces of the electrodes E1, E2 of the sensor element (1-1) shown in FIG. 3.

A method of preparing the sensor element (3-1) will be described. A polyimide precursor sheet is prepared by the same method as in the first embodiment, which is laminated on the comb-electrode side of the electrode-printed sheet (comb electrode/polyimide/NTC thermistor) of the first embodiment and pressure-bonded at a pressure of 200 MPa. Thereafter, the sheet is fired at 350° C. for one hour in an air atmosphere, and then the sheet is cut into the size of the composite sensor, whereby the sensor element (3-1) can be prepared. It is seen that the capacitance of the humidity sensor in the sensor element (3-1) is 1.366 pF, which is larger than the capacitance of the sensor element (1-1) of 0.809 pF.

Figure 7:
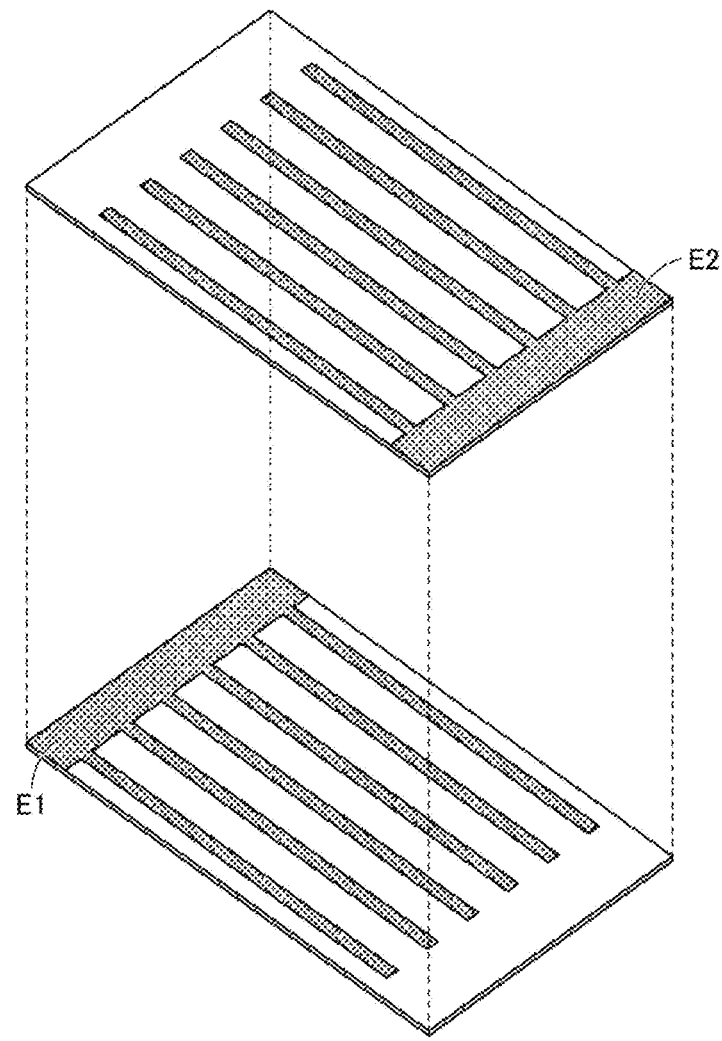
FIG. 7 is a view for explaining electrodes of a sensor element (3-2), which is an example where the electrodes are laminated.
Figure 8:
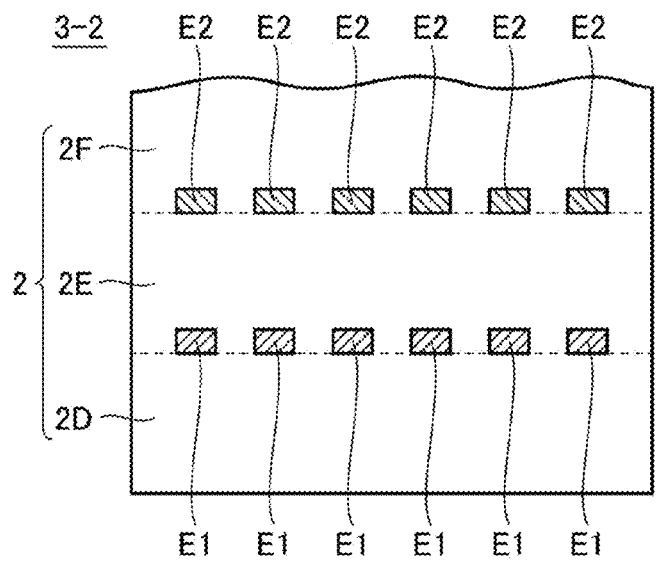
FIG. 8 is a sectional view of the sensor element (3-2), which is an example where electrodes are laminated.

FIG. 7 is a view for explaining electrodes of a sensor element (3-2), which is an example where the electrodes are laminated. FIG. 8 is a sectional view of the sensor element (3-2), which is an example in which the electrodes are laminated. As shown in FIGS. 7 and 8, the capacitance can be further increased by laminating polyimide 2D, 2E, 2F, etc. of the humidity sensor portion and the comb electrodes E1, E2. In the sensor element (3-2) in which the electrodes are laminated, the number of sheets for laminating the polyimide precursor sheet used in the sensor element (3-1) is set to 73. Comb electrodes having the same shape as that of the sensor element (1-1) are printed on the sheets other than the uppermost sheet. The capacitance of the sensor element (3-2) as thus prepared was 103.822 pF.

FIG. 9 is a diagram showing a comparison in characteristics among the sensor elements (1-1), (3-1), (3-2). The changes in the capacitance of the sensor element (3-1) and the sensor element (3-2) when the relative humidity was changed from 10% RH to 90% were examined to be 55.2% for the sensor element (3-1) and 51.8% for the sensor element (3-2), and it was found that larger sensitivities have been obtained than 27.3% for the sensor element (1-1).

FIG. 10 is a sectional view showing a first example of a composite sensor in which the humidity sensor unit has a laminated structure. In the sensor element shown in FIG. 10, the humidity sensor unit 51 of the sensor element (1-1) shown in FIG. 1 is a laminated humidity sensor. In the humidity sensor unit 51, a polyimide sheet having an electrode E1 formed thereon and a polyimide sheet having the electrode E2 formed thereon are laminated alternately. Terminals 52, 53 are formed in the humidity sensor unit 51. In operation, humidity can be detected by measuring the capacitance between terminals 52, 53.

The temperature sensor unit 56 made of the NTC thermistor is disposed on the humidity sensor unit 51.

FIG. 11 is a sectional view showing a second example of the composite sensor in which the humidity sensor unit has the laminated structure. In the sensor element shown in FIG. 11, the humidity sensor unit 61 of the sensor element (1-2) shown in FIG. 5 is a laminated humidity sensor. In the humidity sensor unit 61, a polyimide sheet having an electrode E1 formed thereon and a polyimide sheet having the electrode E2 formed thereon are laminated alternately. Terminals 62, 63 are formed in the humidity sensor unit 61. In operation, humidity can be detected by measuring the capacitance between terminals 62, 63.

The temperature sensor material used for the structure shown in FIG. 10 has been the NTC thermistor, and the temperature sensor material used for the structure shown in FIG. 11 has been Pt. However, the Pt temperature sensor may be used for the structure shown in FIG. 10, and the NTC thermistor may be used for the structure shown in FIG. 11.

Figure 12:
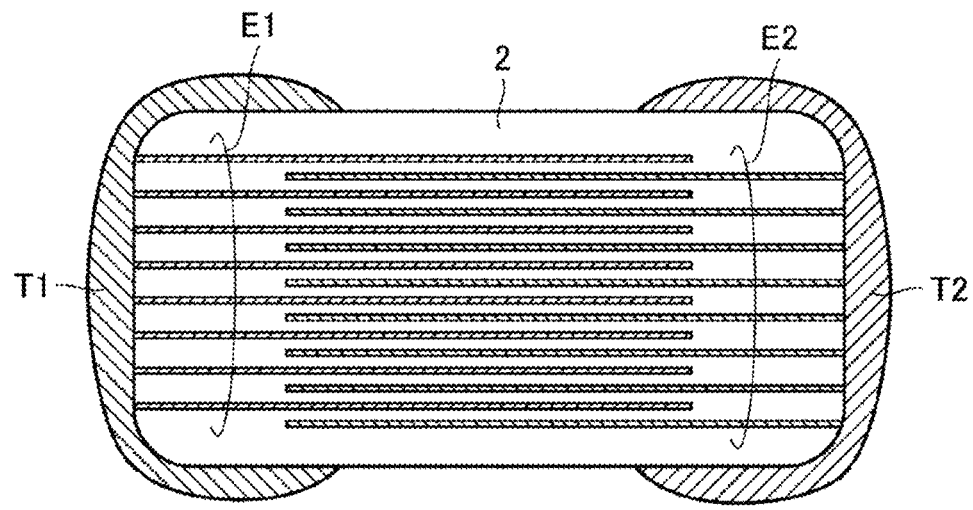
FIG. 12 is a view showing a first example of the laminated arrangement of the electrodes.
Figure 13:
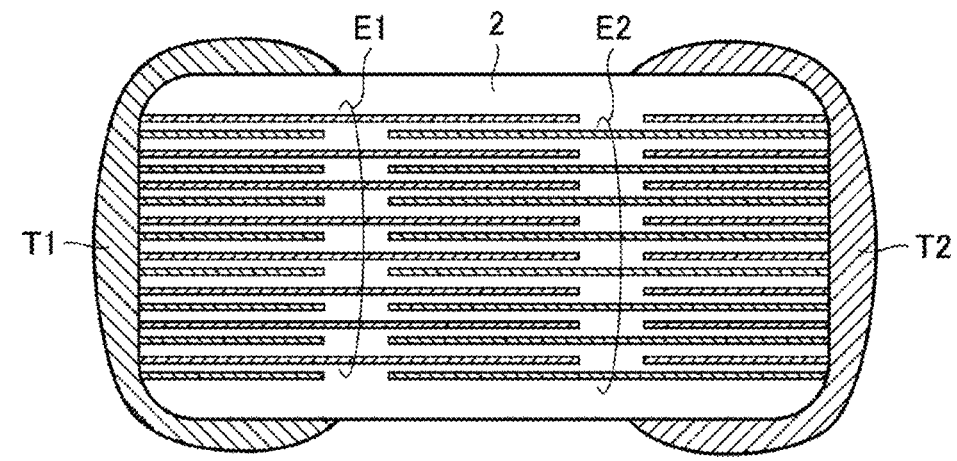
FIG. 13 is a view showing a second example of the laminated arrangement of the electrodes.
Figure 14:
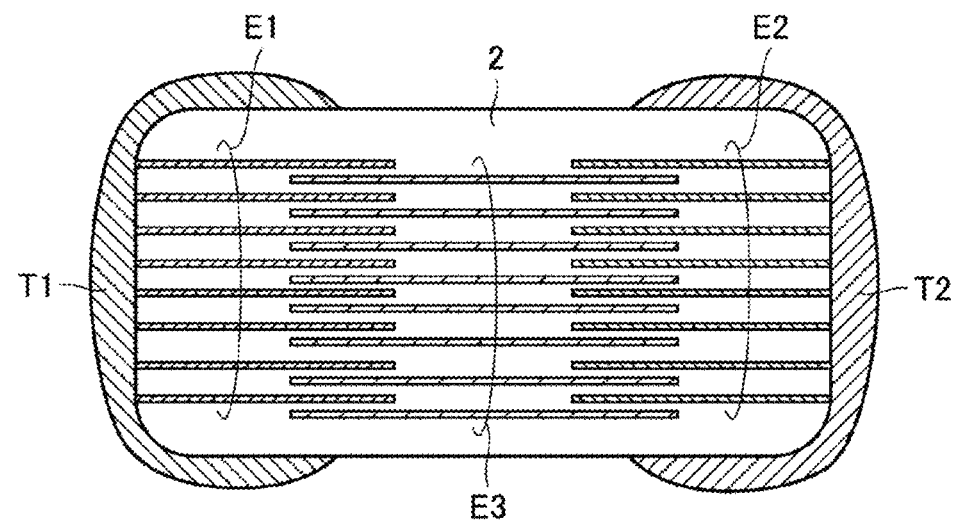
FIG. 14 is a view showing a third example of the laminated arrangement of the electrodes.

The humidity sensor unit 51 shown in FIG. 10 and the humidity sensor unit 61 shown in FIG. 11 have the same shape as a general multilayer ceramic capacitor. In the humidity sensor unit of the third embodiment as well, it is possible to adopt various arrangements of internal electrodes similar to those of the multilayer ceramic capacitor. It is also noted that there are many degrees of freedom in the arrangement of the internal electrodes. FIG. 12 is a view showing a first example of the laminated arrangement of the electrodes. FIG. 13 is a view showing a second example of the laminated arrangement of the electrodes. FIG. 14 is a view showing a third example of the laminated arrangement of the electrodes.

For example, the humidity sensor unit may employ the internal electrode structure shown in each of FIGS. 12 to 14 as is generally known for the multilayer ceramic capacitor. The arrangement shown in FIG. 12 is the most typical electrode arrangement. The arrangement shown in FIG. 13 is an electrode arrangement in which the electrodes E1, E2 are alternately laminated in the center portion. In this case, a counter electrode electrically connected to the terminal T2 is formed with a space from each electrode E1 on the layer where the electrode E1 electrically connected to the terminal T1 is formed, and a counter electrode electrically connected to the terminal T1 with a space from each electrode E2 is formed on the layer where the electrode E2 electrically connected to the terminal T2 is formed. In the arrangement shown in FIG. 14, an electrode E3 is disposed between the electrodes E1, E2. An equivalent circuit of the sensor element of this arrangement is a circuit in which a parallel plate capacitor formed of the electrodes E1, E3 and a parallel plate capacitor formed of electrodes E2, E3 are connected in series. In the humidity sensor as shown in FIGS. 10 to 14, the moisture-sensitive member 2 includes a plurality of moisture-sensitive layers that are disposed such that at least a part of the layers are in contact with each other, and the electrode units of the first electrode E1 are alternately laminated with the plurality of moisture-sensitive layers. The plurality of electrode units of the second electrode E2 are also alternately laminated with the plurality of moisture-sensitive layers.

By forming the plurality of layers of internal electrodes in this manner, the capacitance of the humidity sensor unit can be further increased. In this case, various internal electrode shapes may be combined. Some examples of the internal electrode shape are shown below.

Figure 15:
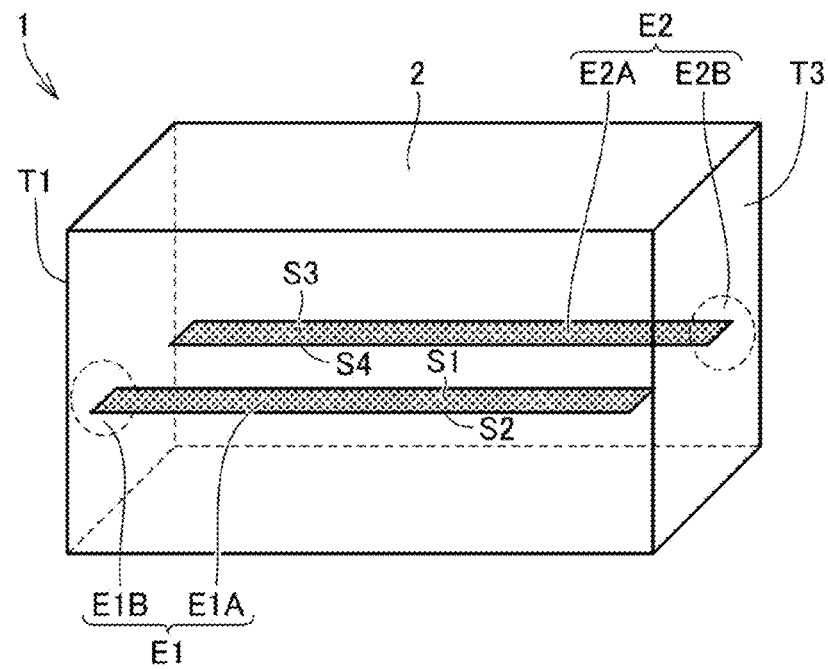
FIG. 15 is a view showing an example of flat plate-shaped counter electrodes formed on the same plane.
Figure 16:
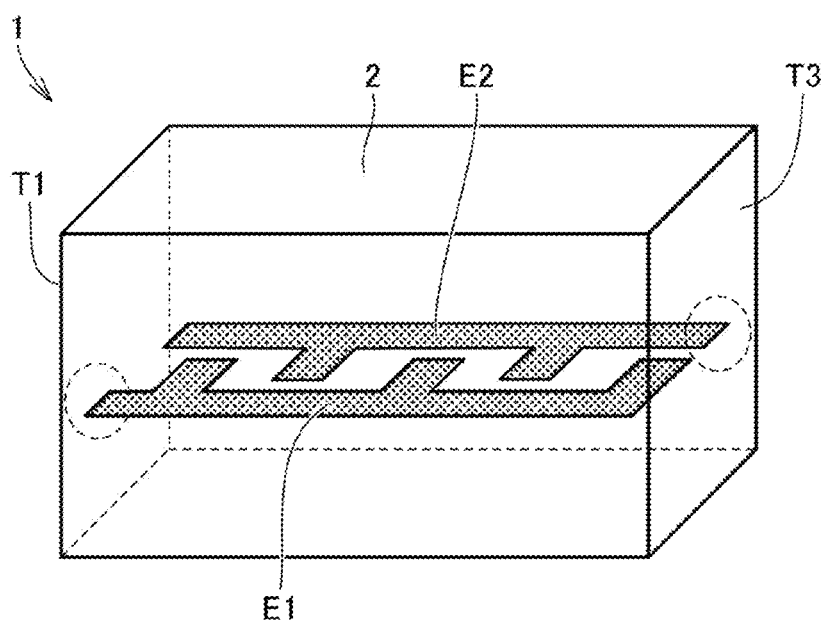
FIG. 16 is a view showing an example of comb-shaped counter electrodes formed on the same plane.
Figure 17:
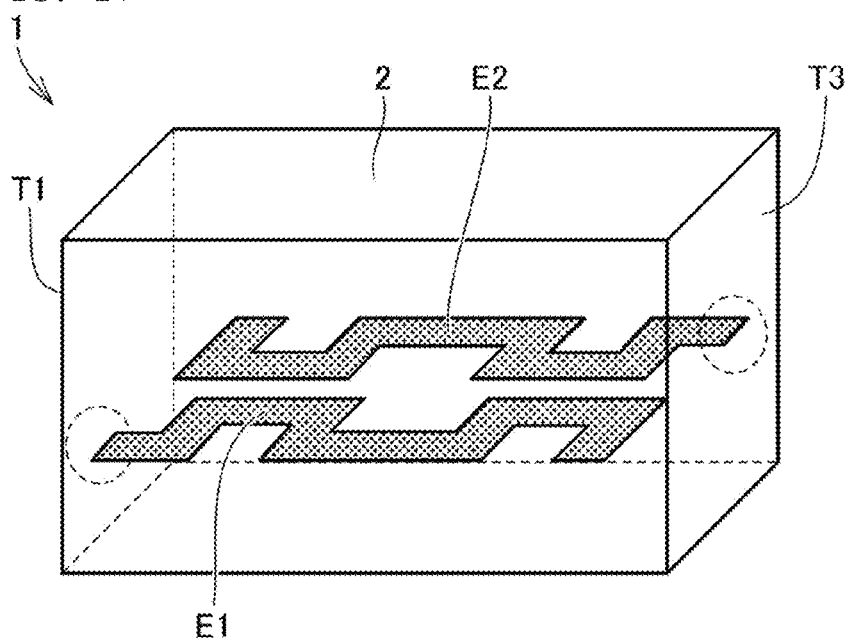
FIG. 17 is a view showing an example of meandering-shaped counter electrodes formed on the same plane.

FIG. 15 is a view showing an example of a flat plate-shaped counter electrode formed on the same plane. FIG. 16 is a view showing an example of comb-shaped counter electrodes formed on the same plane. FIG. 17 is a view showing an example of meandering-shaped counter electrodes formed on the same plane.

Figure 18:
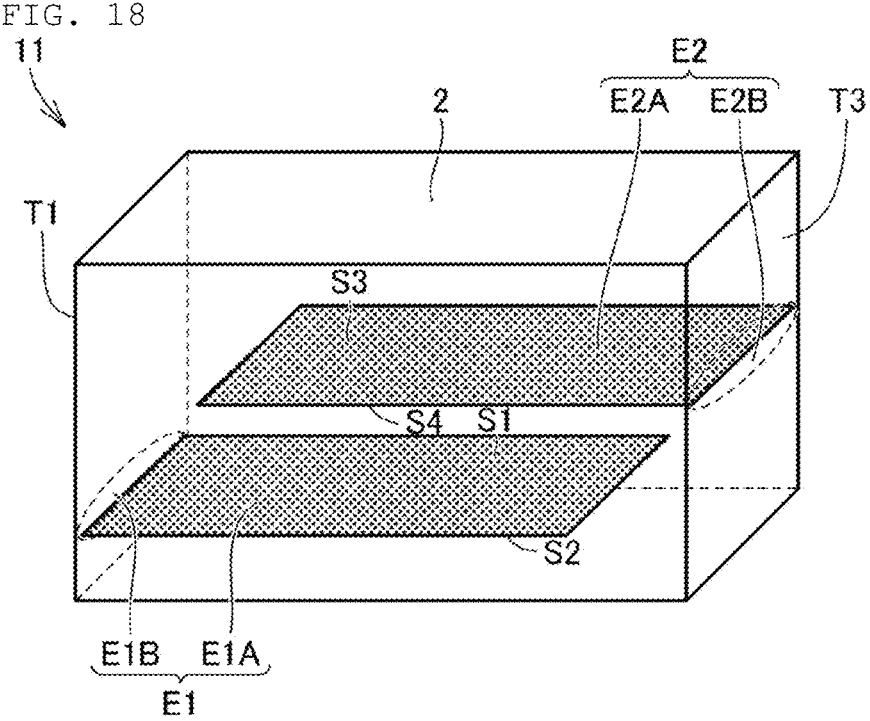
FIG. 18 is a view showing an example of flat plate-shaped counter electrodes formed in different layers.
Figure 19:
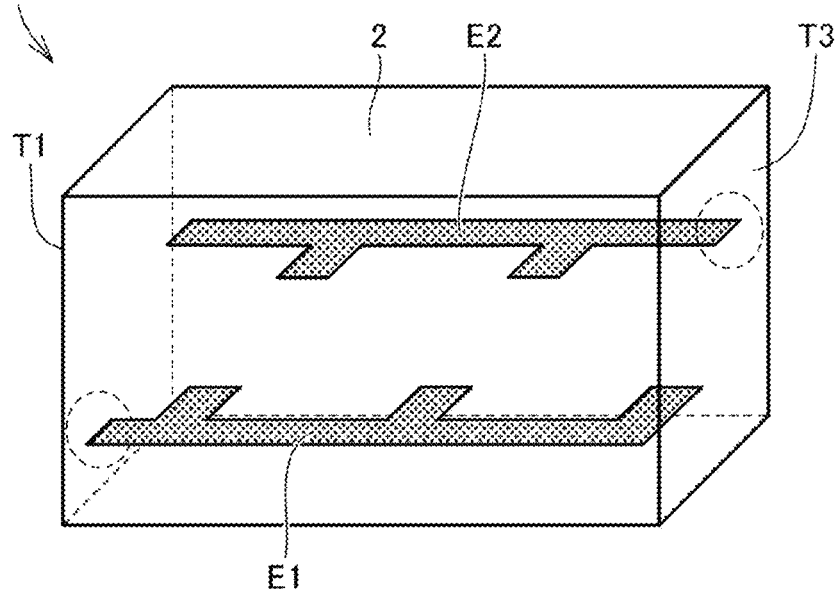
FIG. 19 is a view showing an example of comb-shaped counter electrodes formed in different layers.
Figure 20:
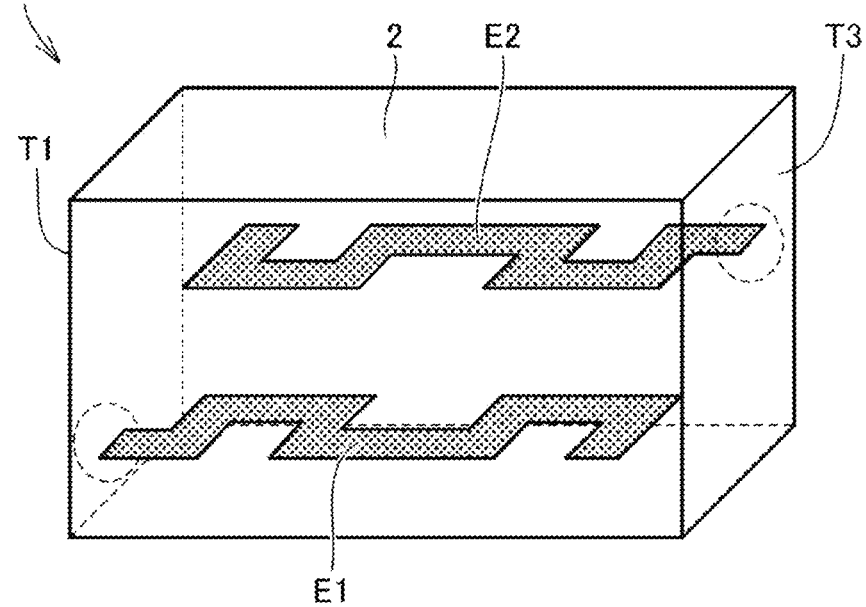
FIG. 20 is a view showing an example of meandering-shaped counter electrodes formed in different layers.

FIG. 18 is a view showing an example of flat plate-shaped counter electrodes formed in different layers. FIG. 19 is a view showing an example of comb-shaped counter electrodes formed in different layers. FIG. 20 is a view showing an example of meandering-shaped counter electrodes formed in different layers.

By combining various internal electrode shapes as shown in FIGS. 15 to 20, prepare a humidity sensor can be provided with high capacitance and fast response and recovery speeds. For example, the flat plate-shaped electrode may be disposed in the center part of the element and the comb electrode-shaped or meandering-shaped electrode or some other electrode may be disposed outside the humidity sensor unit.

Referring to FIGS. 15 and 18 as representatives, the characteristics of the humidity sensor unit having the internal electrode will be described. The humidity sensor units 1, 11 are each provided with the first electrode E1 electrically connected to a first terminal T1, and the second electrode E2 electrically connected to a third terminal T3. The first electrode E1 includes the first internal electrode unit E1A having a first main surface S1 covered with the moisture-sensitive member 2, and a second main surface S2 covered with the moisture-sensitive member 2. The second electrode E2 includes a second internal electrode unit E2A having a third main surface S3 covered with the moisture-sensitive member 2, and a fourth main surface S4 covered with the moisture-sensitive member 2. The first internal electrode unit E1A includes a portion facing at least a part of the second internal electrode unit E2A across the moisture-sensitive member 2. As thus described, by the composite sensor including the humidity sensor unit in which the first electrode E1 and the second electrode E2 are embedded in the moisture-sensitive member 2, the humidity detection sensitivity is improved, and the electrode is protected from corrosive gas to improve the reliability of the humidity sensor unit.

In the case of a resistance change-type humidity sensor using a moisture-sensitive member with resistivity changing in accordance with humidity, a sensor element formed by preparing a structure having electrodes as internal electrodes like the sensor element (3-1) is taken as a sensor element (3-3). By changing the humidity in the sensor element (3-3) from 10% RH to 90% RH, the resistance value of the electric resistance changed about 75 times from 619 kΩcm to 8.3 kΩcm. Considering that the change in resistance of the sensor element (2-1) was about 48 times, it is understood that the sensitivity of the humidity sensor unit has been improved in the sensor element (3-3) by adopting the structure using the internal electrode.

Fourth Exemplary Embodiment

In a fourth embodiment, as the electrode for the capacitance-type humidity sensor, an internal electrode is provided inside a humidity sensor material, and the internal electrode is formed into a coil shape. As the internal electrode, a combination of electrode shapes such as a flat plate shape, a comb shape, and a meandering shape may be used, and a plurality of layers of these electrodes may be formed.

According to the fourth embodiment, since the L component of the humidity sensor can be increased, the resonance circuit for humidity measurement can be resonated without using an external inductor.

Figure 21:
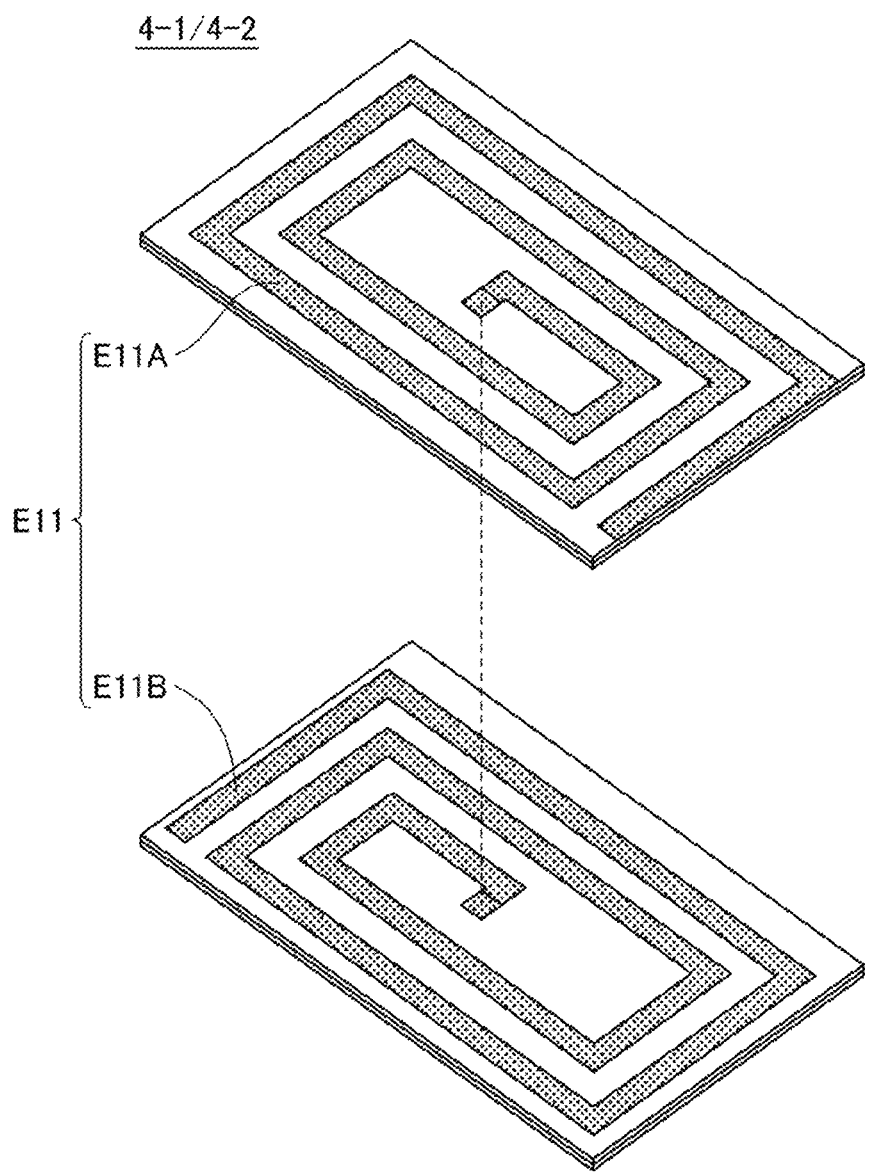
FIG. 21 is a view showing as an example of planar coil electrodes used in a fourth embodiment.

As an example, a case of a planar coil-shaped electrode will be described. FIG. 21 is a view showing as an example of the planar coil electrodes used in the fourth embodiment. A sensor element (4-1) having the following structure is shown: in a size of 1.2 mm×2.0 mm in length×width, a planar coil-shaped upper electrode with an L/S (line/space) of 100 μm/100 μm and a planar coil-shaped lower electrode are connected through a via at the center part.

According to an exemplary aspect, the sensor element (4-1) can be prepared by the following method. A polyimide precursor sheet is prepared in the same manner as in the first embodiment. A via is opened on the polyimide precursor sheet by using a laser puncher. After the via is opened, Ag paste is poured into the via and dried at 60° C., and then, coil-shaped Ag electrodes E11A, E11B are formed on both sides by printing. Drying is performed at 60° C. for every single-side printing. Thereafter, a thick film of $NiMn_2O_4$ for the NTC thermistor having a thickness of 10 μm, patterned by using a metal mask, is formed on one side of the sheet at room temperature by an aerosol deposition method (AD method). As the electrode for the NTC thermistor, a NiCr/Monel/Ag electrode is formed by sputtering, for example.

The sheet is cut into a target size and then fired under an air atmosphere at 350° C. for one hour. After an Ag extended electrode is formed on the fired sample, the sample is further fired at 100° C. to complete preparation of a target composite sensor element. The inventors of the present invention experimentally confirmed that the resonance frequency of the sensor element (4-1) was 6.907 GHz.

A sensor element (4-1) is formed by laminating a polyimide with a thickness of 15 μm on an external electrode of the sensor element (4-2), for example. The sensor element (4-2) can be prepared by the following: a polyimide precursor sheet after electrode printing in the preparation process of the sensor element (4-1) is laminated on a polyimide sheet having no electrode printed thereon, which is pressure-bonded at a pressure of 200 MPa and then fired at 350° C. for one hour in an air atmosphere. The inventors of the present invention experimentally confirmed that the resonance frequency in this structure was 5.559 GHz, and the resonance frequency was able to be lowered as compared to that of the sensor element (4-1).

Figure 22:
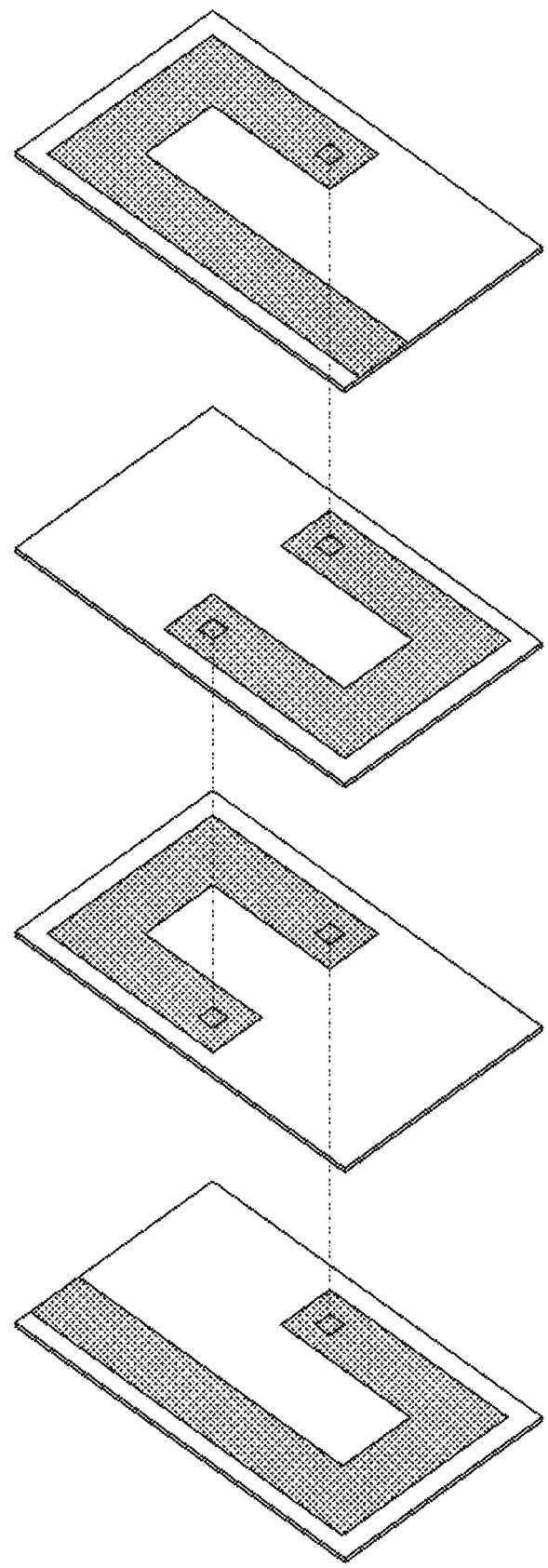
FIG. 22 is a view showing a state where a three-dimensional coil is formed inside the element.

Further, when a three-dimensional coil is formed inside the element as in a general chip inductor, the resonance frequency can be further lowered. FIG. 22 is a view showing a state where a three-dimensional coil is formed inside the element. The element employing the three-dimensional coil shown in FIG. 22 is taken as a sensor element (4-3). The sensor element (4-3) is obtained, as in the cases of the sensor element (4-1) and the sensor element (4-2), by opening a via in the polyimide precursor sheet, pouring an Ag electrode, printing the Ag electrode, and laminating 73 sheets in total. The inventors of the present invention experimentally confirmed that the resonance frequency of the sensor element (4-3) prepared in this manner was 0.715 GHz. FIG. 23 is a diagram showing the characteristics of the sensor elements (4-1), (4-2), (4-3) side by side. It is seen that in the sensor element (4-3), the resonance frequency can be significantly lowered as compared to the sensor element (4-1) and the sensor element (4-2). Therefore, the resonance frequency necessary for humidity measurement can be measured using a low-speed microcomputer having a low clock frequency.

Fifth Exemplary Embodiment

In a fifth embodiment, in the configuration of the composite sensor, a composite material of a humidity sensor material and a material having a dielectric constant different from that of the humidity sensor material is used as the moisture-sensitive member of the humidity sensor unit. The material having a different dielectric constant has higher relative permittivity than the humidity sensor material. As the humidity sensor material, for example, polyimide, polyamide-imide, polyamide, cellulose acetate butyrate (CAB), polymethyl methacrylate (PMMA), vinyl crotonate, polyethylene terephthalate, or a mixture thereof can be used. As the material having high relative permittivity, a ceramic dielectric material, such as $BaTiO_3$, $Pb(Zr,Ti)O_3$, $(K,Na)NbO_3$, or $CaCu_3Ti_4O_{12}$, can be used. For each component of the composite material, the humidity sensor material and the dielectric material may be uniformly mixed, non-uniformly mixed, or localized.

Advantageously, by using the composite material of the material having high relative permittivity and the humidity sensor material, the capacitance of the humidity sensor unit can be increased.

As an example of the composite material of the humidity sensor material and the material having high relative permittivity, a composite material of polyimide and $BaTiO_3$, which is a ferroelectric material, was examined. The same material as the polyimide varnish was used as a polyimide raw material, and powder of $BaTiO_3$ was mixed with the polyimide varnish such that the volume ratio of polyimide to $BaTiO_3$ was 1:1. The mixture is used as a raw material for preparing a composite sheet, and sheet formation, electrode printing, lamination, pressure bonding, and firing are performed in the same manner and under the same conditions as in the first embodiment, whereby a humidity sensor using a composite sheet of polyimide and $BaTiO_3$ can be prepared.

Sensor elements having structures, formed by preparing the same structures as those of the sensor elements (1-1), (3-1), (3-2) described in the first and third embodiments using the composite sheet of polyimide and $BaTiO_3$, are taken as sensor elements (5-1), (5-2), (5-3), respectively.

FIG. 24 is a diagram showing the characteristics of the sensor elements (5-1), (5-2), (5-3) side by side. The capacitances of the humidity sensor units of the sensor elements (5-1), (5-2), (5-3) are 6.760 pF, 13.810 pF, and 1.209 nF. It is seen therefrom that the capacitances are about 8.35 to 11.65 times larger than when the moisture-sensitive member made of only polyimide is used.

As another example of the composite material, a composite material having a volume ratio of polyimide to $CaCu_3Ti_4O_{12}$, which is not a ferroelectric substance but exhibits a high dielectric constant, of 5:1 was examined in the same manner as above.

Sensor elements having structures, formed by preparing the same structures as those of the sensor elements (1-1), (3-1), (3-2) described in the first and third embodiments using the polyimide/$CaCu_3Ti_4O_{12}$ composite sheet, are taken as sensor elements (5-4), (5-5), (5-6), respectively.

FIG. 25 is a diagram showing the characteristics of the sensor elements (5-4), (5-5), (5-6) side by side. The capacitances of the humidity sensor units of the sensor elements (5-4), (5-5), (5-6) are 31.595 pF, 66.081 pF, and 5.873 nF. It is seen therefrom that the capacitances are about 39.05 to 56.57 times larger than when only polyimide is used.

Sixth Exemplary Embodiment

In a sixth embodiment, a moisture-sensitive member using a composite material of a humidity sensor material and a material having relative magnetic permeability higher than that of the humidity sensor material is examined. As the material having high relative magnetic permeability, various ferrites (spinel ferrite, hexagonal ferrite, garnet ferrite, etc.), various ceramic magnetic materials (iron oxide, etc.), permalloy, various stainless steels, and various metal magnetic materials (FePt, PtCo, FeCo, Ni, Fe, etc.) can be used. For each component of the composite material, the humidity sensor material and the magnetic material may be uniformly mixed, non-uniformly mixed, or localized.

Advantageously, by using the composite material of the material having high relative magnetic permeability and the humidity sensor material, the inductance of the humidity sensor unit can be increased. This configuration eliminates the need for an external inductor when an LC oscillation circuit is constituted using the composite sensor.

As an example of the composite material of the humidity sensor material and the material having high relative magnetic permeability μr, a composite material of polyimide and a ferrite material having a relative magnetic permeability μr of 1300 was examined. The same material as the polyimide varnish was used as a polyimide raw material, and the powder of the ferrite material was mixed with the polyimide varnish and ferrite material such that the volume ratio of polyimide to the ferrite material was 1:1. The mixture is used as a raw material for preparing a composite sheet, and sheet formation, electrode printing, lamination, pressure bonding, and firing are performed in the same manner and under the same conditions as at the time of preparing the sensor element (1-1) of the first embodiment, to prepare a humidity sensor using the composite sheet of polyimide and the ferrite material. Structures formed by preparing the same structures as those of the sensor elements (4-1), (4-2), (4-3) shown in the fourth embodiment using the composite sheet of polyimide and the ferrite material, are taken as sensor elements (6-1), (6-2), (6-3).

FIG. 26 is a diagram showing the characteristics of the sensor elements (6-1), (6-2), (6-3) side by side. The resonance frequencies of the sensor elements (6-1), (6-2), (6-3) are 3.677 GHz, 0.427 GHz, and 39.812 MHz, respectively. It is seen therefrom that the frequencies are about 46.76% to 94.54% lower than when a moisture-sensitive member made of only polyimide is used.

Seventh Exemplary Embodiment

In a seventh embodiment, a combination of the fifth embodiment (the composite of the humidity sensor material and the dielectric material) and the sixth embodiment (the composite of the humidity sensor material and the magnetic material) is examined. That is, a composite material of the humidity sensor material, the dielectric material having a dielectric constant higher than that of the humidity sensor material, and the magnetic material is used for the moisture-sensitive member of the humidity sensor unit.

Advantageously, by using such a composite material, both the capacitance and inductance of the humidity sensor unit can be increased. In addition, an external inductor, which is used at the time of constituting the LC oscillation circuit by using the composite sensor, becomes unnecessary.

As in the fifth and sixth embodiments, a composite sheet is prepared by mixing the humidity sensor material, a dielectric material, and a magnetic material.

For example, a case will be described where polyimide varnish, $BaTiO_3$ powder, and ferrite material powder are mixed such that the volume ratio of polyimide, $BaTiO_3$, and the ferrite material (with relative magnetic permeability μr of 1300) is 2:1:1. Structures formed by preparing the same structures as those of the sensor elements (4-1), (4-2), (4-3) using the composite sheet of polyimide, $BaTiO_3$, and the ferrite material in the same manner as in the fourth embodiment, are taken as sensor elements (7-1), (7-2), (7-3).

Figures 27, 28:
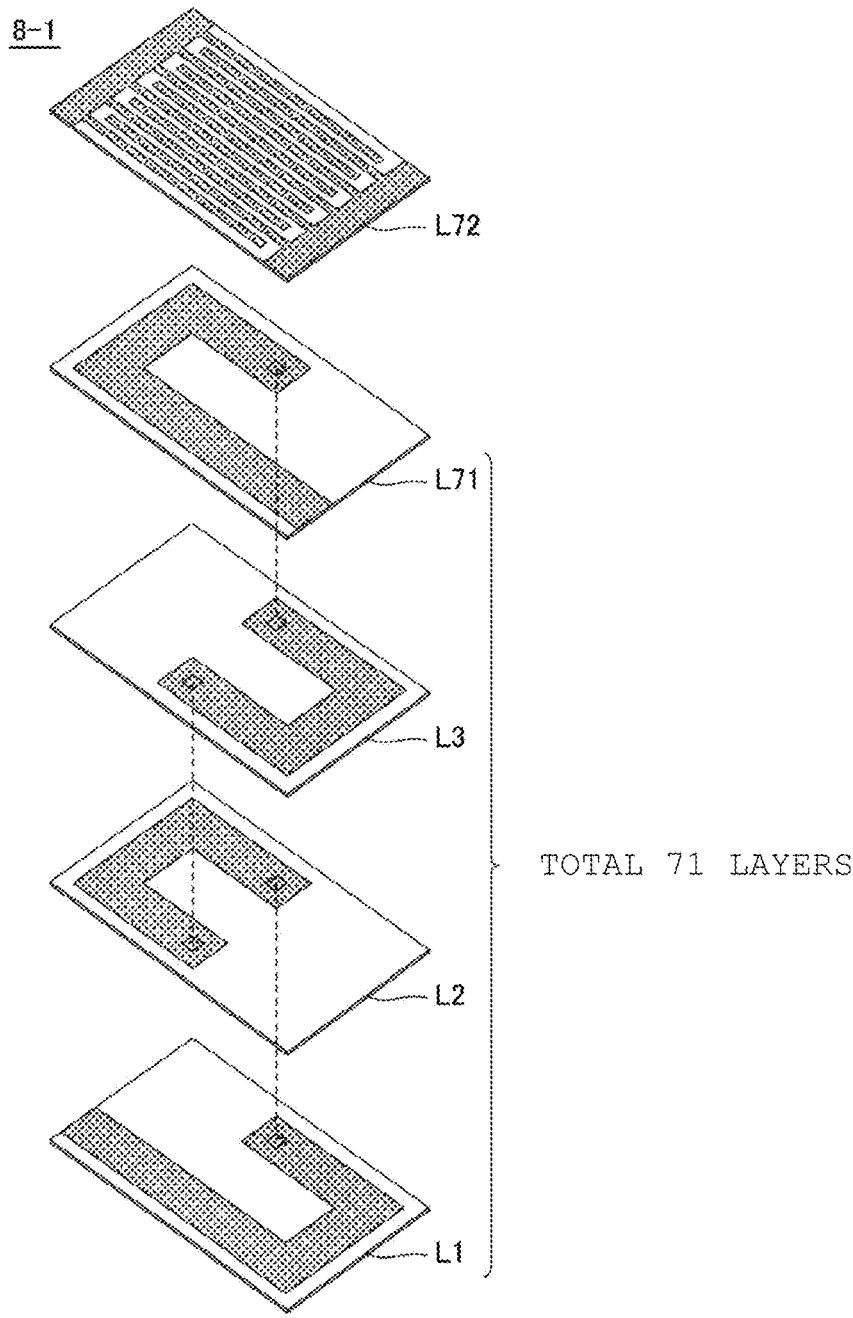
FIG. 27 is a diagram showing characteristics of sensor elements (7-1), (7-2), (7-3) side by side.
FIG. 28 is a view for explaining the shapes of laminated coil electrodes of a humidity sensor unit in an eighth embodiment.

FIG. 27 is a diagram showing the characteristics of the sensor elements (7-1), (7-2), (7-3) side by side. The resonance frequencies of the humidity sensor units of the sensor elements (7-1), (7-2), (7-3) are 2.239 GHz, 0.309 GHz, and 28.151 MHz, respectively. It is seen therefrom that the resonance frequencies are about 67.58% to 96.08% lower than when the moisture-sensitive member made of only polyimide is used.

Eighth Exemplary Embodiment

There is an advantage in that increasing the amounts of the dielectric and magnetic materials leads to increases in capacitance and inductance, whereas there is a disadvantage in that the sensitivity to a change in humidity deteriorates because these materials do not respond to the humidity. Therefore, in an eighth embodiment, while the proportions of the dielectric substance and the magnetic substance are increased in the center portion of the element of the humidity sensor unit, the proportion of polyimide is increased near the surface of the element of the humidity sensor unit.

It is noted that the distribution of the proportion of the humidity sensor material may be uniform, non-uniform, or localized so long as the above requirements are satisfied.

When the concentration of the humidity sensor material on the surface part is increased as described above, the change in capacitance due to humidity can be increased, so that the sensitivity to humidity can be increased while the capacitance and inductance are kept large.

FIG. 28 is a view for explaining the shapes of laminated coil electrodes of the humidity sensor unit in the eighth embodiment. The following case is taken as a sensor element (8-1): in the configuration of the sensor element (6-3) described in the sixth embodiment, of the 73 layers of laminated sheets, two layers from the surface are made of 100% polyimide, and the central 71 layers are made of a composite sheet with a mixture ratio being a volume ratio of polyimide to the ferrite material (with relative magnetic permeability $\mu r$ of 1300) of 1:1.

In the sensor element (8-1), the electrode on the surface sandwiched by the polyimide sheets is the same comb electrode as the sensor element (1-1). The resonance frequency of the sensor element (8-1) is 42.193 MHz. Although this resonance frequency is slightly higher than the resonance frequency of 39.812 MHz of the sensor element (6-3), the change in resonance frequency due to the change in humidity from 10% RH to 90% RH is 23.28%. It is understood that the rate of change is higher than 20.66% for the sensor element (6-3). It is thus understood that the sensitivity to humidity can be increased as compared to the case of the sixth embodiment.

In the sensor element (8-1), the material composition in the center portion is the same for comparison with the sensor element (6-3), but the resonance frequency can be lowered by increasing the proportion of the ferrite material in the center portion. Further, by increasing the proportion and thickness of the polyimide on the surface, the sensitivity to humidity can be increased despite the increase in the resonance frequency of the sensor element.

Ninth Exemplary Embodiment

The composite sensor of the eighth embodiment is characterized in that the moisture-sensitive member of the humidity sensor unit includes the first portion and the second portion that is disposed closer to the main surface (outer surface) of the humidity sensor unit than the first portion and has a higher proportion of the humidity sensor material (polyimide, etc.) than the first portion.

A composite sensor of a ninth embodiment is the same as the composite sensor of the eighth embodiment in that the proportion of the humidity sensor material on the element surface of the humidity sensor unit is 100%, but the composite sensor of a ninth embodiment is different in that the proportion of the humidity sensor material inside the element is 0%. This proportion is the most suitable example in which the change in capacitance due to the change in humidity can be increased while the capacitance and inductance are increased.

By setting the proportion of the humidity sensor material of the surface sheet to 100%, a sufficiently large sensitivity is obtained due to the change in capacitance of the surface sheet.

As an example, a description will be given of a method of preparing a sensor element (9-1) having a center part made of a 100% ferrite material (with relative magnetic permeability $\mu r$ of 1300) in the sensor element (8-1) shown in FIG. 28. In this case, the center part is the same as a general chip inductor structure, so that a general preparation process can be used as it is.

Ferrite material powder, a binder, a plasticizer, a defoaming agent, and a wetting agent are dissolved in water, agitated, and defoamed to form a slurry for sheet molding. A sheet is moved while the slurry is dried at a temperature of 60° C. by using a 100 μm doctor blade to prepare a ferrite sheet on a PET film. After an Ag electrode is printed on the sheet, 71 sheets are laminated and then pressure-bonded at a pressure of 200 MPa. Thereafter, firing is performed at 900° C. for two hours to obtain laminated ferrite sheets L1 to L71.

The polyimide varnish was spin-coated on the laminated ferrite sheets L1 to L71 and then dried at 130° C. Thereafter, a sheet L72 having a comb electrode pattern of Ag printed thereon is disposed, and the polyimide varnish is further spin-coated on the upper part of the sheet L72 and dried at 130° C. Thereafter, as in the first embodiment, the NTC thermistor of $NiMn_2O_4$ and the electrode are formed on the L1 side of the laminated sheet by the AD method. By the method as thus described, a polyimide precursor/Ag electrode/polyimide precursor/laminated ferrite sheets/NTC thermistor structure can be formed. In this state, firing is performed at 350° C. for one hour in an air atmosphere and then cut into a target size, whereby the sensor element (9-1) can be prepared.

FIG. 29 is a diagram showing the characteristics of the sensor elements (6-3), (8-1), (9-1) side by side. As shown in FIG. 29, the resonance frequency of the sensor element (9-1) is 9.560 MHz, and it is seen that the resonance frequency is lower than the resonance frequency of the sensor element (8-1). The rate of change in resonance frequency due to the humidity change from 10% RH to 90% RH was 10.85%. This is a very large change in frequency of about 1.1 MHz, although the rate of change is lower than that of the sensor element (8-1). Therefore, by adopting the structure of the sensor element (9-1), a sufficiently large change in frequency can be obtained while the resonance frequency is lowered significantly.

As described above, in the composite sensor of each of the first to ninth embodiments, separate voltages can be applied to the temperature sensor unit by using the first terminal and the second terminal, and to the humidity sensor unit by using the first terminal and the third terminal, so that it is possible to simultaneously measure temperature and humidity. With the temperature sensor and the humidity sensor having the integral structure, the temperature of the humidity sensor and the humidity of the temperature sensor can be corrected more accurately. In addition, due to the integral structure, the size can be reduced at the time of mounting as compared to when the temperature sensor and the humidity sensor are provided separately. Furthermore, due to the three-terminal structure, the mounting area can be reduced as compared to a composite sensor having a four-terminal structure.

In general, it is noted that the description of the exemplary embodiments should be considered as being illustrative in all respects and not being restrictive.

DESCRIPTION OF REFERENCE SYMBOLS

1-1: Composite sensor,
2: Moisture-sensitive member,
2D, 2E, 2F: Polyimide,
1, 11, 51, 61: Humidity sensor unit, 52, 53, 57, 62, 63, T1, T2, T3: Terminal,
56, 66: Temperature sensor unit,
E1, E2, E3, E11A, E11B: Electrode,
FL: Lower surface,
FS1 to FS4: First to fourth side-surfaces,
FU: Upper surface,
L1 to L71: Laminated ferrite sheet

The invention claimed is:

1. A composite sensor comprising:
   a temperature sensor that includes a temperature-sensitive member having a resistivity that changes in accordance with a temperature and a humidity sensor that includes a moisture-sensitive member having a capacitance or a resistivity that changes in accordance with a humidity;
   a first terminal configured for both the temperature sensor and the humidity sensor;
   a second terminal disposed and configured to measure an electrical characteristic of the temperature-sensitive member with the first terminal; and
   a third terminal disposed and configured to measure an electrical characteristic of the moisture-sensitive member with the first terminal,
   wherein the composite sensor has a rectangular parallelepiped shape that includes first to fourth surfaces along a laminating direction of the composite sensor, and
   wherein the first terminal is disposed on the first surface, and the third terminal is disposed on the third surface that is a surface opposite to the first surface.

2. The composite sensor according to claim 1, wherein the temperature-sensitive member is laminated on the moisture-sensitive member.

3. The composite sensor according to claim 2, wherein the first terminal is disposed on a surface along a laminating direction of the composite sensor.

4. The composite sensor according to claim 3, wherein the second terminal is disposed on a surface orthogonal to the laminating direction.

5. The composite sensor according to claim 1,
   wherein the first terminal is a ground terminal,
   wherein a direct current (DC) voltage source is connected between the first terminal and the second terminal, and
   wherein an alternating current (AC) voltage source is connected between the first terminal and the third terminal.

6. The composite sensor according to claim 1, further comprising:
   a first electrode electrically connected to the first terminal and including a first internal electrode unit that has a first main surface covered with the moisture-sensitive member, and a second main surface covered with the moisture-sensitive member; and
   a second electrode electrically connected to the third terminal and including a second internal electrode unit that has a third main surface covered with the moisture-sensitive member, and a fourth main surface covered with the moisture-sensitive member.

7. The composite sensor according to claim 6, wherein the first internal electrode unit and the second internal electrode unit are disposed across the moisture-sensitive member.

8. The composite sensor according to claim 1, wherein the moisture-sensitive member comprises a composite material that includes a first material having a capacitance that changes in accordance with a change in the humidity, and a second material having a dielectric constant different from a dielectric constant of the first material.

9. The composite sensor according to claim 1, wherein the moisture-sensitive member comprises a composite material that includes a first material having capacitance that changes in accordance with a change in the humidity, and a second material that is a magnetic sub stance.

10. The composite sensor according to claim 1, wherein the moisture-sensitive member comprises a composite material that includes a first material having capacitance that changes in accordance with a change in the humidity, a second material having a dielectric constant different from a dielectric constant of the first material, and a third material that is a magnetic sub stance.

11. A composite sensor comprising:
    a temperature sensor that includes a temperature-sensitive member having a resistivity that changes in accordance with a temperature and a humidity sensor that includes a moisture-sensitive member having a capacitance or a resistivity that changes in accordance with a humidity;
    a first terminal configured for both the temperature sensor and the humidity sensor;
    a second terminal disposed and configured to measure an electrical characteristic of the temperature-sensitive member with the first terminal; and
    a third terminal disposed and configured to measure an electrical characteristic of the moisture-sensitive member with the first terminal,
    wherein the moisture-sensitive member comprises a composite material that includes a first material having a capacitance that changes in accordance with a change in the humidity, and a second material having a dielectric constant different from a dielectric constant of the first material, and
    wherein the moisture-sensitive member includes a first portion and a second portion that is disposed closer to a main surface of the moisture-sensitive member than the first portion and has a higher proportion of the first material than the first portion.

12. The composite sensor according to claim 9, wherein the moisture-sensitive member includes a first portion and a second portion that is disposed closer to a main surface of the moisture-sensitive member than the first portion and has a higher proportion of the first material than the first portion.

13. The composite sensor according to claim 10, wherein the moisture-sensitive member includes a first portion and a second portion that is disposed closer to a main surface of the moisture-sensitive member than the first portion and has a higher proportion of the first material than the first portion.

14. A composite sensor comprising:
    a main body having a rectangular parallelepiped shape;
    a temperature sensor integrated in the main body and including includes a temperature-sensitive member and a humidity sensor that includes a moisture-sensitive member;
    a first terminal coupled to both the temperature sensor and the humidity sensor;
    a second terminal configured to measure an electrical characteristic of the temperature-sensitive member with the first terminal; and
    a third terminal configured to measure an electrical characteristic of the moisture-sensitive member with the first terminal,
    wherein the first terminal is a ground terminal,
    wherein a direct current (DC) voltage source is connected between the first terminal and the second terminal, and
    wherein an alternating current (AC) voltage source is connected between the first terminal and the third terminal.

15. The composite sensor according to claim 13, wherein the temperature-sensitive member has a resistivity that changes in accordance with a temperature and the moisture-sensitive member has a capacitance or a resistivity that changes in accordance with a humidity.

16. The composite sensor of claim 14,
wherein the composite sensor includes first to fourth surfaces along a laminating direction of the composite sensor, and
wherein the first terminal is disposed on the first surface, and the third terminal is disposed on the third surface that is a surface opposite to the first surface.

17. The composite sensor according to claim 16, wherein the second terminal is disposed on a surface orthogonal to the laminating direction.

\* \* \* \* \*